(12) United States Patent
Spiegel

(10) Patent No.: US 9,705,831 B2
(45) Date of Patent: Jul. 11, 2017

(54) APPARATUS AND METHOD FOR MAINTAINING A MESSAGE THREAD WITH OPT-IN PERMANENCE FOR ENTRIES

(71) Applicant: Snapchat, Inc., Pacific Palisades, CA (US)

(72) Inventor: Evan Spiegel, Pacific Palisades, CA (US)

(73) Assignee: Snap Inc., Venice, CA (US)

( * ) Notice: Subject to any disclaimer, the term of this patent is extended or adjusted under 35 U.S.C. 154(b) by 0 days.

(21) Appl. No.: 13/906,261

(22) Filed: May 30, 2013

(65) Prior Publication Data
US 2014/0359024 A1 Dec. 4, 2014

(51) Int. Cl.
*G06F 15/16* (2006.01)
*H04L 12/58* (2006.01)

(52) U.S. Cl.
CPC .................. *H04L 51/16* (2013.01)

(58) Field of Classification Search
CPC ... G06Q 10/107; H04L 12/5885; H04L 12/58; H04L 12/581; H04L 51/00; H04L 51/04; H04L 51/16; H04L 51/18; H04L 51/32; H04L 63/0428; H04L 51/22; H04L 51/34; H04L 51/30
USPC ........................................................ 709/206
See application file for complete search history.

(56) References Cited

U.S. PATENT DOCUMENTS

| | | | |
|---|---|---|---|
| 5,999,932 A * | 12/1999 | Paul | |
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,216,141 B1 | 4/2001 | Straub et al. | |
| 6,310,694 B1 * | 10/2001 | Okimoto et al. | 358/1.15 |
| 6,484,196 B1 * | 11/2002 | Maurille | 709/206 |
| 6,665,531 B1 * | 12/2003 | Soderbacka et al. | 455/412.1 |
| 6,724,403 B1 | 4/2004 | Santoro et al. | |
| 6,757,713 B1 * | 6/2004 | Ogilvie et al. | 709/206 |
| 6,898,626 B2 | 5/2005 | Ohashi | |
| 7,004,394 B2 | 2/2006 | Kim | |
| 7,124,164 B1 | 10/2006 | Chemtob | |
| 7,149,893 B1 * | 12/2006 | Leonard et al. | 713/154 |
| 7,203,380 B2 | 4/2007 | Chiu et al. | |
| 7,243,163 B1 | 7/2007 | Friend et al. | |
| 7,356,564 B2 * | 4/2008 | Hartselle et al. | 709/206 |
| 7,519,670 B2 * | 4/2009 | Hagale et al. | 709/206 |
| 7,856,449 B1 | 12/2010 | Martino et al. | |
| 8,001,204 B2 | 8/2011 | Burtner et al. | |

(Continued)

FOREIGN PATENT DOCUMENTS

CA    2887596 A1    6/2016

OTHER PUBLICATIONS

Sewers, Paul. "Snapchat for iOS lets you send photos to friends and set how long they're visible for". May 7, 2012. <http://thenextweb.com/apps/2012/05/07/snapchat-for-ios-lets-you-send-photos-to-friends-and-set-how-long-theyre-visible-for/#!xCjrp>. pp. 1-5.*

(Continued)

*Primary Examiner* — Christopher Biagini
(74) *Attorney, Agent, or Firm* — Cooley LLP

(57) ABSTRACT

A server includes a message thread module with instructions executed by a processor to maintain a message thread between a first user and a second user. Each entry of the message thread is deleted after a display period unless an indication regarding the entry is received during the display period.

2 Claims, 6 Drawing Sheets

(56) References Cited

U.S. PATENT DOCUMENTS

| | | |
|---|---|---|
| 8,098,904 B2 | 1/2012 | Ioffe et al. |
| 8,112,716 B2 | 2/2012 | Kobayashi |
| 8,276,092 B1 | 9/2012 | Narayanan et al. |
| 8,279,319 B2 | 10/2012 | Date |
| 8,312,086 B2 | 11/2012 | Velusamy et al. |
| 8,312,097 B1 | 11/2012 | Siegel et al. |
| 8,379,130 B2 | 2/2013 | Forutanpour et al. |
| 8,405,773 B2 | 3/2013 | Hayashi et al. |
| 8,418,067 B2 | 4/2013 | Cheng et al. |
| 8,471,914 B2 | 6/2013 | Sakiyama et al. |
| 8,560,612 B2 | 10/2013 | Kilmer et al. |
| 8,687,021 B2 | 4/2014 | Bathiche et al. |
| 8,744,523 B2 | 6/2014 | Fan et al. |
| 8,775,972 B2 | 7/2014 | Spiegel |
| 8,788,680 B1 | 7/2014 | Naik |
| 8,797,415 B2 | 8/2014 | Arnold |
| 8,856,349 B2 | 10/2014 | Jain et al. |
| 9,098,832 B1 | 8/2015 | Scardino |
| 9,396,354 B1 | 7/2016 | Murphy et al. |
| 9,407,712 B1 | 8/2016 | Sehn |
| 9,407,816 B1 | 8/2016 | Sehn |
| 2002/0047868 A1 | 4/2002 | Miyazawa |
| 2002/0122659 A1 | 9/2002 | McGrath et al. |
| 2002/0144154 A1* | 10/2002 | Tomkow ............... 713/201 |
| 2003/0016247 A1 | 1/2003 | Lai et al. |
| 2003/0052925 A1 | 3/2003 | Daimon et al. |
| 2003/0126215 A1 | 7/2003 | Udell et al. |
| 2003/0164856 A1 | 9/2003 | Prager et al. |
| 2004/0027371 A1 | 2/2004 | Jaeger |
| 2004/0111467 A1 | 6/2004 | Willis |
| 2004/0203959 A1 | 10/2004 | Coombes |
| 2004/0243531 A1 | 12/2004 | Dean |
| 2005/0078804 A1 | 4/2005 | Yomoda |
| 2005/0097176 A1* | 5/2005 | Schatz et al. ............... 709/206 |
| 2005/0104976 A1 | 5/2005 | Currans |
| 2005/0114783 A1 | 5/2005 | Szeto |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson et al. |
| 2005/0223066 A1 | 10/2005 | Buchheit et al. |
| 2006/0114338 A1 | 6/2006 | Rothschild |
| 2006/0270419 A1 | 11/2006 | Crowley et al. |
| 2007/0040931 A1 | 2/2007 | Nishizawa |
| 2007/0064899 A1 | 3/2007 | Boss et al. |
| 2007/0073823 A1* | 3/2007 | Cohen et al. ............... 709/207 |
| 2007/0082707 A1 | 4/2007 | Flynt et al. |
| 2007/0192128 A1 | 8/2007 | Celestini |
| 2007/0214216 A1 | 9/2007 | Carrer et al. |
| 2007/0233801 A1* | 10/2007 | Eren et al. ............... 709/207 |
| 2007/0243887 A1 | 10/2007 | Bandhole et al. |
| 2007/0255456 A1 | 11/2007 | Funayama |
| 2008/0025701 A1 | 1/2008 | Ikeda |
| 2008/0033930 A1 | 2/2008 | Warren |
| 2008/0055269 A1 | 3/2008 | Lemay et al. |
| 2008/0104503 A1 | 5/2008 | Beall et al. |
| 2008/0207176 A1* | 8/2008 | Brackbill et al. ............ 455/413 |
| 2008/0222545 A1 | 9/2008 | Lemay et al. |
| 2008/0256446 A1 | 10/2008 | Yamamoto |
| 2008/0266421 A1 | 10/2008 | Takahata et al. |
| 2008/0270938 A1 | 10/2008 | Carlson |
| 2008/0313346 A1 | 12/2008 | Kujawa et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0132453 A1 | 5/2009 | Hangartner et al. |
| 2009/0132665 A1 | 5/2009 | Thomsen et al. |
| 2009/0160970 A1 | 6/2009 | Fredlund et al. |
| 2009/0265647 A1 | 10/2009 | Martin et al. |
| 2010/0082693 A1 | 4/2010 | Hugg et al. |
| 2010/0131880 A1 | 5/2010 | Lee et al. |
| 2010/0131895 A1 | 5/2010 | Wohlert |
| 2010/0156933 A1 | 6/2010 | Jones et al. |
| 2010/0159944 A1* | 6/2010 | Pascal et al. ............... 455/456.1 |
| 2010/0161831 A1 | 6/2010 | Haas et al. |
| 2010/0185665 A1 | 7/2010 | Horn et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0257196 A1 | 10/2010 | Waters et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0102630 A1 | 5/2011 | Rukes |
| 2011/0145564 A1 | 6/2011 | Moshir et al. |
| 2011/0197194 A1 | 8/2011 | D'Angelo et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0273575 A1 | 11/2011 | Lee |
| 2011/0283188 A1 | 11/2011 | Farrenkopf et al. |
| 2011/0320373 A1 | 12/2011 | Lee et al. |
| 2012/0028659 A1 | 2/2012 | Whitney et al. |
| 2012/0062805 A1 | 3/2012 | Candelore |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco et al. |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1* | 7/2012 | Speede ............... 455/411 |
| 2012/0200743 A1 | 8/2012 | Blanchflower et al. |
| 2012/0210244 A1 | 8/2012 | deFrancisco Lopez et al. |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0299954 A1 | 11/2012 | Wada et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0323933 A1 | 12/2012 | He et al. |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0128059 A1 | 5/2013 | Kristensson |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0198176 A1 | 8/2013 | Kim |
| 2013/0222323 A1 | 8/2013 | McKenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0290443 A1 | 10/2013 | Collins et al. |
| 2013/0344896 A1 | 12/2013 | Kirmse et al. |

(56) References Cited

U.S. PATENT DOCUMENTS

| | | |
|---|---|---|
| 2013/0346877 A1 | 12/2013 | Borovoy et al. |
| 2014/0011538 A1 | 1/2014 | Mulcahy et al. |
| 2014/0032682 A1 | 1/2014 | Prado et al. |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0189592 A1 | 7/2014 | Benchenaa et al. |
| 2014/0201527 A1* | 7/2014 | Krivorot ............ G06F 21/6209 713/168 |
| 2014/0207679 A1 | 7/2014 | Cho |
| 2014/0214471 A1 | 7/2014 | Schreiner, III |
| 2014/0279436 A1 | 9/2014 | Dorsey et al. |
| 2014/0280537 A1 | 9/2014 | Pridmore et al. |
| 2014/0282096 A1 | 9/2014 | Rubinstein et al. |
| 2014/0298210 A1 | 10/2014 | Park et al. |
| 2014/0317302 A1 | 10/2014 | Naik |
| 2014/0325383 A1 | 10/2014 | Brown et al. |
| 2015/0046278 A1 | 2/2015 | Pei et al. |
| 2015/0116529 A1 | 4/2015 | Wu et al. |
| 2015/0172534 A1 | 6/2015 | Miyakawa et al. |
| 2015/0222814 A1 | 8/2015 | Li et al. |

OTHER PUBLICATIONS

Fajman, R. "RFC 2298: An Extensible Message Format for Message Disposition Notifications". IETF Network Working Group, Mar. 1998. pp. 1-28.*

IVISIT, "iVisit Mobile Getting Started", Dec. 4, 2013, iVisit, pp. 1-16.

Melanson, Mike, "This text message will self destruct in 60 seconds", available on Feb. 11, 2011, retrieved from readwrite.com on Feb. 18, 2015, link: http://readwrite.com/2011/02/11/this_text_message_will_self_destruct_in_60_seconds, referred to hereinafter as READ-WRITE.

International Search Report and Written Opinion issued to international patent application No. PCT/US2015/037251, Sep. 29, 2015, 7 pgs.

Shein, "Ephemeral Data", Communications of the ACM, vol. 56, No. 9, Sep. 2013, pp. 20-22.

Snapchat, "How Snaps Are Stored and Deleted", May 9, 2013, 3 pgs.

International Search Report and Written Opinion issued to International Patent Application No. PCT/US2014/040346, Mar. 23, 2015, 9 pgs.

Supplementary European Search Report issued to EP Application No. 14804343.3, Sep. 29, 2016, 11 pgs.

Voxer Business, "Android Getting Started Guide", Feb. 1, 2014, 18 pgs.

* cited by examiner

APPARATUS AND METHOD FOR MAINTAINING A MESSAGE THREAD WITH OPT-IN PERMANENCE FOR ENTRIES

FIELD OF THE INVENTION

This invention relates generally to communications in a networked environment. More particularly, this invention relates to maintaining a message thread with opt-in permanence for entries.

BACKGROUND OF THE INVENTION

Communications between individuals are increasingly digitized and transmitted via the Internet. Individuals are communicating through text messages, email messages, voice mail messages and the like. In the case of a text message between two individuals a conversation thread is maintained. Each individual contributes text to a chronologically listed record of the communications between the two individuals. With each new communication, a new entry is added to the communication thread. Either individual can review the conversation thread at any time and edit it locally in the messaging client.

Maintaining a complete and precise record of a sequence of communication may inhibit the spontaneity of an interaction. For example, when one has a conversation with an individual, it is typically not recorded and therefore the exchange may be more candid.

A live conversation between two individuals may be memorialized with notes, but in this case there is visual feedback indicating when one individual is recording information, which allows the other individual to clarify a point or otherwise alter the direction of the conversation.

Storing the entire contents of a digital conversation may also make it difficult to surface the most important information. It is a case of information overload. Selectively saving certain communications in an ephemeral conversation thread allows the user to quickly recall or reference important aspects of the thread.

In view of the foregoing, it would be desirable to have a digital communication mechanism that more naturally mimics the types of interactions to which individuals are accustomed.

SUMMARY OF THE INVENTION

A server includes a message thread module with instructions executed by a processor to maintain a message thread between a first user and a second user. Each entry of the message thread is deleted after a display period unless an indication regarding the entry is received during the display period.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
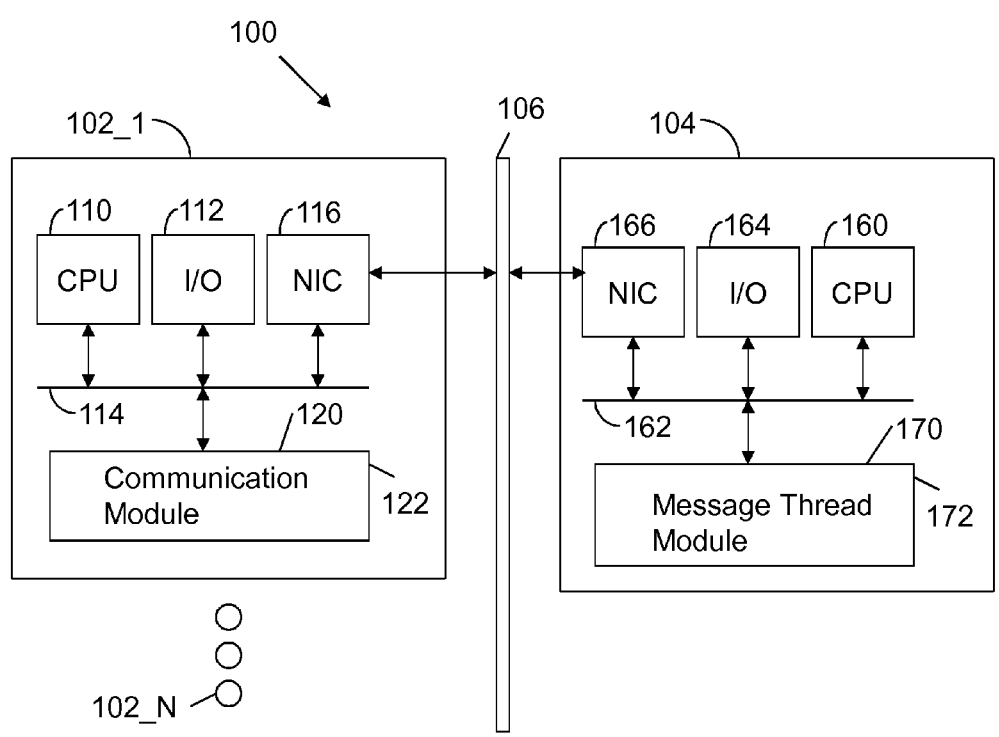
FIG. 1 illustrates a system configured in accordance with an embodiment of the invention.

FIG. 1 illustrates a system 100 configured in accordance with an embodiment of the invention. The system 100 includes a set of client devices 102_1 through 102_N and at least one server 104 connected via a network 106, which may be any wired or wireless network.

Each client device 102 may be a computer, tablet, Smartphone and the like with standard components, such as a central processing unit 110 connected to input/output devices 112 via a bus 114. The input/output devices 112 may include a touch display, keyboard, mouse and the like. A network interface circuit 116 is also connected to the bus 114 to provide connectivity with network 106.

A memory 120 is also connected to the bus 114. The memory 120 stores standard components, such as a communication module 122. The communication module 122 may be a text message module that supports Short Message Service (SMS) texting. Alternately, the communication module 122 may be a browser, which supports access to an email server. Alternately, the communication module 122 may be a telephony interface that supports telephone interactions, such as voice messages.

Server 104 also includes standard components, such as a central processing unit 160 connected to input/output devices 164 via a bus 162. A network interface circuit 166 is also connected to the bus 162. Further, a memory 170 is connected to the bus 162. The memory 170 stores modules of executable instructions to implement disclosed operations. For example, the memory 170 may store a message thread module 172, which maintains a thread of communications between at least two individuals. The thread of communications may be a text message thread, an email with a sequence of returned communications or a voice mail file with a sequence of returned communications.

The configuration of system 100 is exemplary. The system 100 may include multiple servers 104 and a variety of communication devices to support various forms of digital communication.

Figure 2:
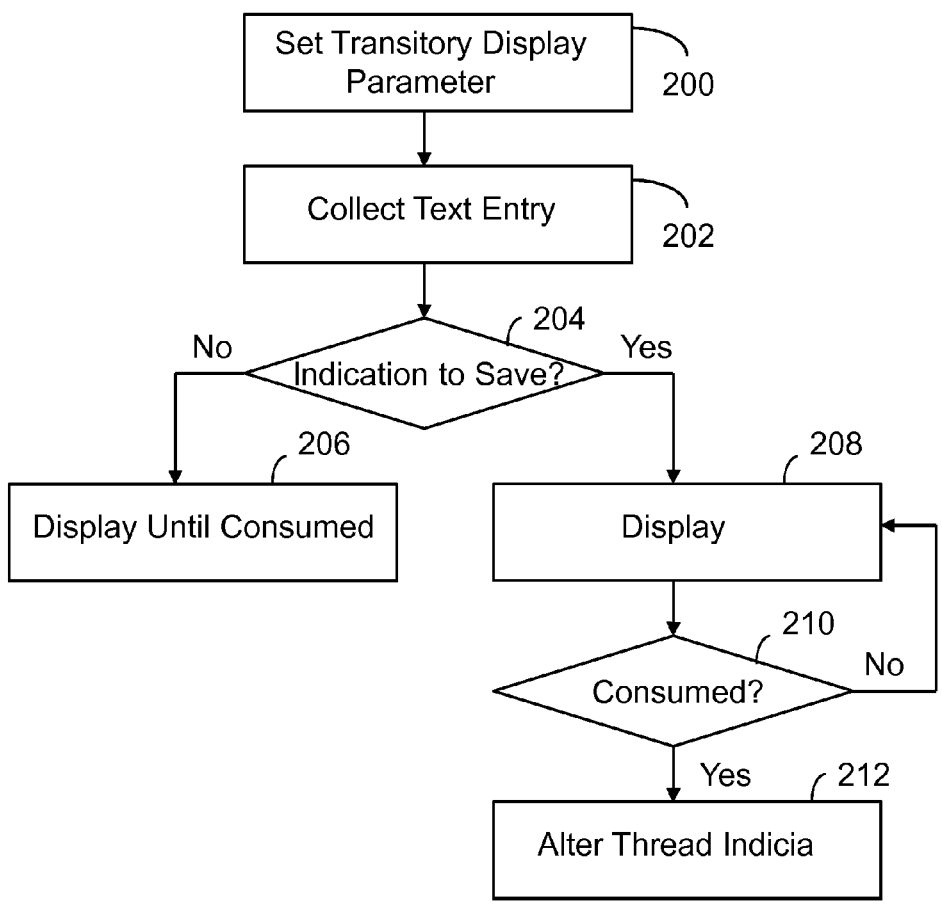
FIG. 2 illustrates message generation processing utilized in accordance with an embodiment of the invention.

FIG. 2 illustrates processing operations associated with an embodiment of the message thread module 172. In particular, the figure illustrates message generation processing utilized in accordance with an embodiment of the invention. By way of example, operations will be discussed in the context of text messaging.

Initially, a transitory display parameter is set 200. The transitory display parameter may be set as a default value (e.g., a 3 second viewing period) or it may be set through user input. The notion associated with the transitory display parameter is that all message entries will be deleted after the transitory display parameter time expires and therefore message entries are transitory, unless an individual opts-in for message entry permanence.

The next operation of FIG. 2 is to collect a text entry 202. The text entry collection process is terminated when an individual indicts that the text entry should be sent. At this point it is determined if there was an indication to save the text entry 204. The indication may be in the form of a gesture applied to the screen where the text is entered. Alternately, the indication may be based upon a specified key or combination of keys on a keyboard used to enter the text.

If there is no indication to save the entry (204—No), then the text is displayed in the thread associated with the sender and the recipient. When the recipient reads or otherwise consumes the entry, the entry is deleted from the thread associated with the sender 206.

If there is an indication to save the entry (204—Yes), then the entry is displayed in its original form in the thread associated with the sender and the recipient. A check is periodically made to determine if the entry has been read by the recipient 210. If not (210—No), the entry continues to be displayed in its original form. If so (210—Yes), indicia associated with the thread is altered 212. That is, after the recipient reads the entry the nature of the entry will be altered on the sending side and the receiving side. If the recipient does not provide an indication to save the entry, then the indicia of the entry on the sending side thread will be altered to indicate that only one of the two parties (the sender) has saved the entry. If the recipient provides an indication to save the entry, then the indicia of the entry on the sending side and the receiving side is altered to indicate that both of the parties have saved the entry. In an alternate embodiment, the message may be restored in the sender side thread if the recipient provides an indication to save the message. This restoration in the sender side thread includes indicia that the recipient saved the message, although the sender originally declined to do so.

The operations of FIG. 2 are performed by the message thread module 172 operating in conjunction with a client device 102. That is, operations such as collecting a text entry 202 and identifying an indication to save 204 are performed at the client device 102, with the results of the operations passed and processed to the message thread module 172. Similarly, the display until consumed operation 206, display operation 208 and altering of thread indicia 212 are manifested at the client device 102 in response to information supplied by the message thread module 172.

Figure 3:
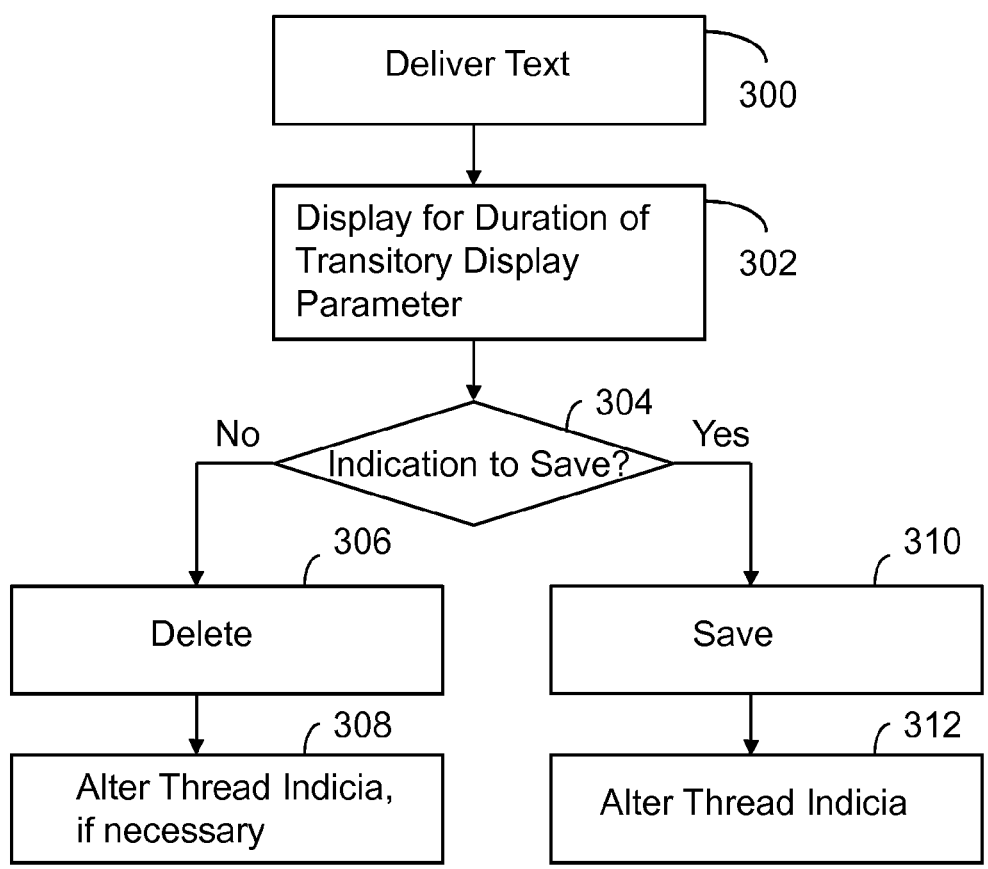
FIG. 3 illustrates message consumption processing utilized in accordance with an embodiment of the invention.

FIG. 3 illustrates message consumption processing operations performed in accordance with an embodiment of the invention. The message thread module 127 coordinates the delivery of the text to the recipient 300. The text is displayed for the duration of the transitory display parameter 302. That is, the message thread module 127 directs the client device 102 to display the text for the duration of the transitory display parameter. Alternately, the text may be displayed until it is actively deleted or the user scrolls past it without saving it.

It is determined whether there is an indication to save the entry 304 during the duration of the transitory display parameter. If not (304—No), the message is deleted 306 from the recipient's thread. Thread indicia of the sender is altered, if necessary 308. That is, if the sender elected to preserve the entry, then indicia associated with the entry would be altered to indicate that the sender preserved the entry, but the recipient did not.

If there is an indication to save the entry (304—Yes), the entry is saved in the recipient's thread 310. The thread indicia is altered 312 to at least indicate that the recipient has saved the entry. If the sender also saved the entry, then the sender's indicia and the recipient's indicia reflect that both entities have saved the message.

Figure 4:
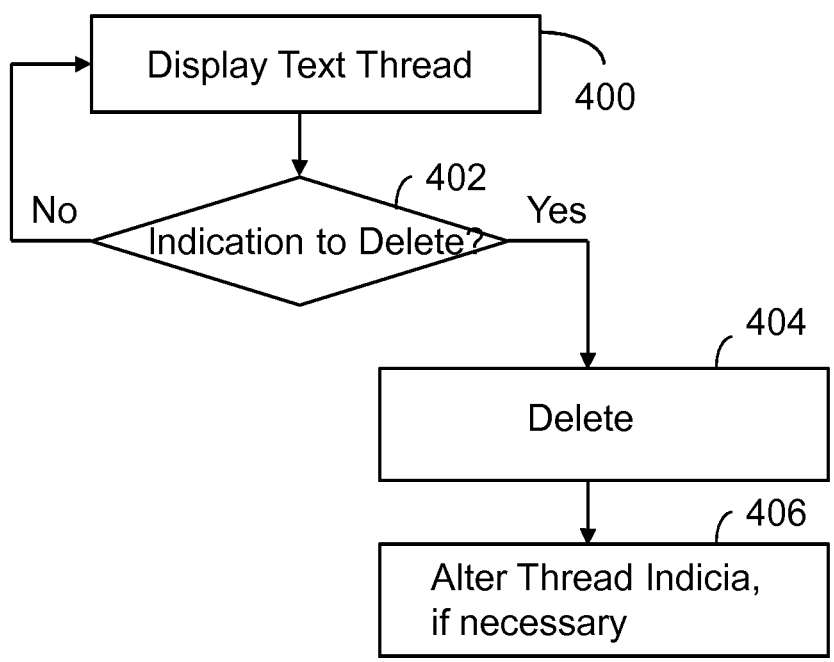
FIG. 4 illustrates message thread review processing utilized in accordance with an embodiment of the invention.

FIG. 4 illustrates thread review processing that may be performed in accordance with an embodiment of the invention. Initially, a text thread is displayed to a user 400. The text thread is between the user and one or more other users. As the user scrolls through the text thread, individual entries may be deleted. If so (402—Yes), the individual entry is deleted 404. If necessary, indicia associated with the entry on another device is altered 406. For example, if another user had saved the entry and the present user had saved the entry initially, then the indicia associated with the entry on the two client devices would indicate that both parties saved the entry. After one party deletes the entry, the indicia associated with the entry for the other party indicates that only a single party has saved the entry.

Figure 5:
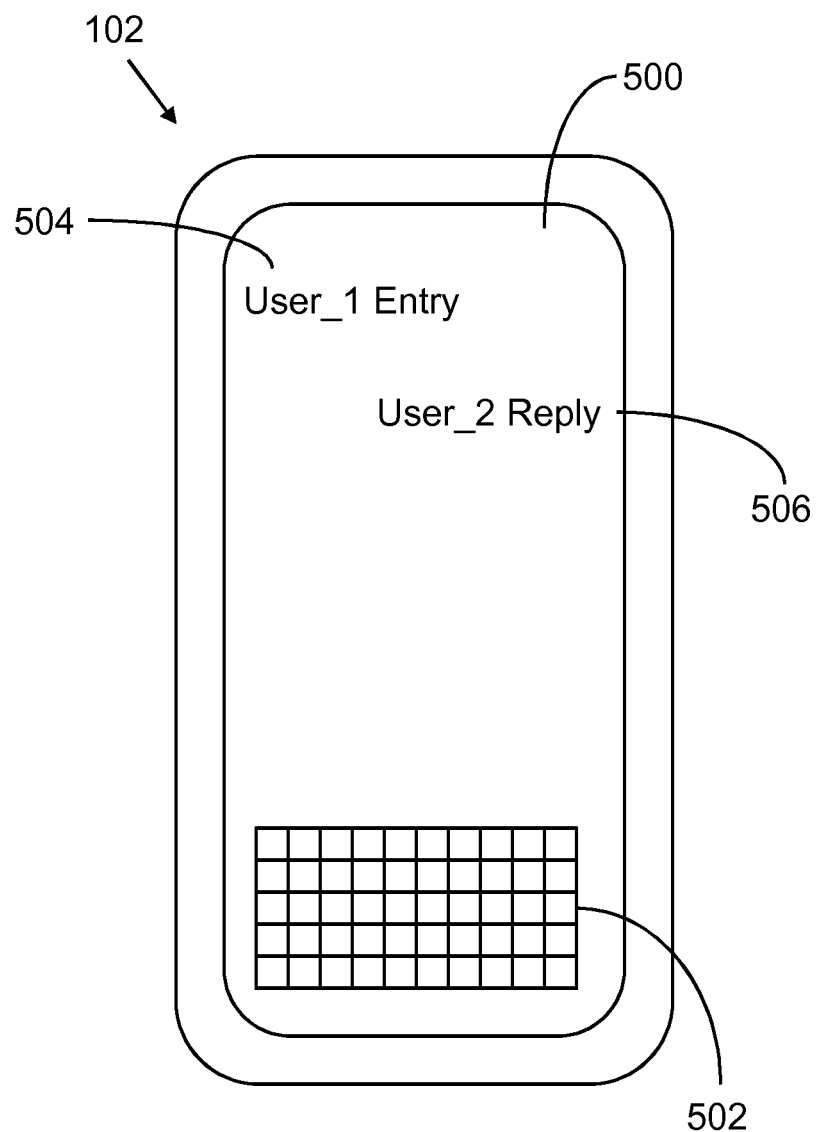
FIG. 5 illustrates a first message thread displayed in accordance with an embodiment of the invention.

FIG. 5 illustrates a client device 102 with a display screen 500 and a keyboard 502. The display screen 500 displays a thread including a first entry 504 from a first user and a second entry 506 from a second user. The first entry 504 is persisted in response to a gesture applied to the display screen 500. The second entry 506 is also persisted in response to a gesture applied to the display screen 500.

Figure 6:
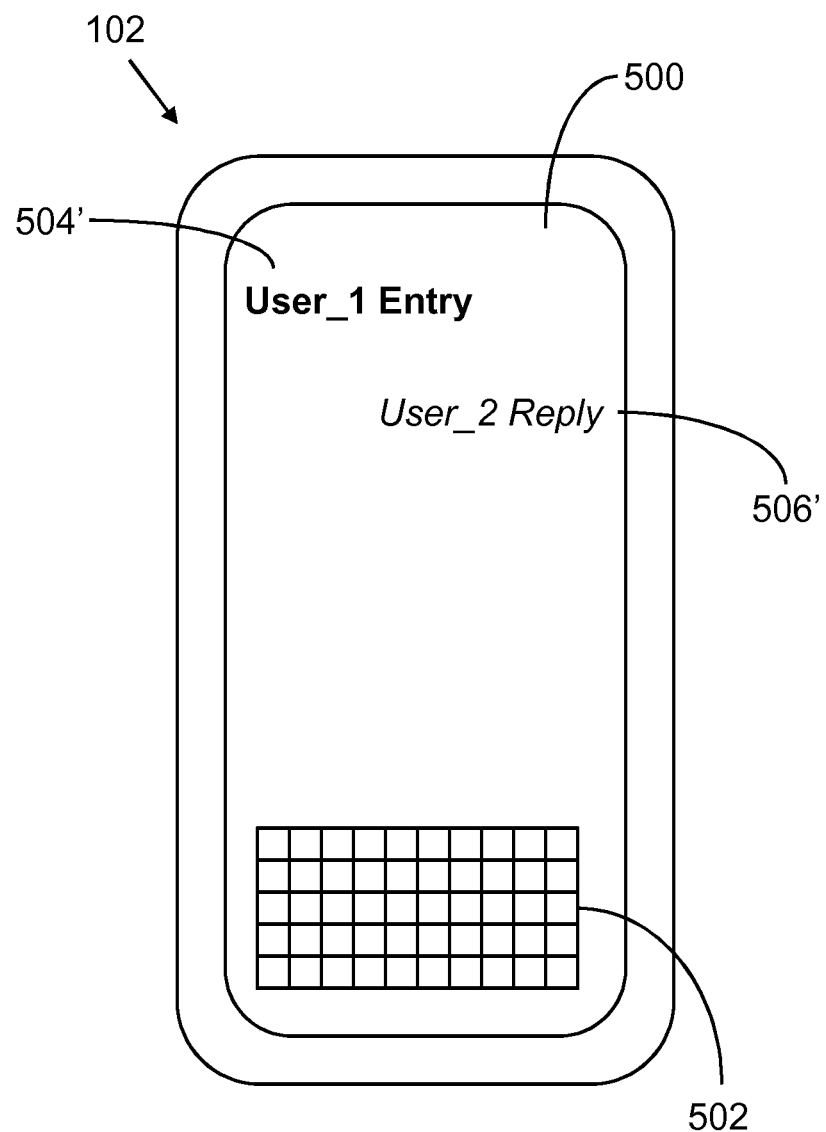
FIG. 6 illustrates the message thread of FIG. 5 with altered parameters associated with entries of the message thread.

FIG. 6 illustrates updated indicia indicating different states of entry preservation. Entry 504' is in bold to reflect that both the sender and the recipient persisted the entry. Entry 506' is italicized to indicate that the reply was preserved by the recipient, but not the sender.

Thus, in this example, a parameter in the form of varying fonts is altered to reflect the persistence of an entry. Other parameters may be used, such as a separate graphic indicative of the preservation states. Alternately, the parameter may be in the form of a number where a 1 indicates that only the user of the client device has saved the entry and where the number 2 indicates that two parties have saved the entry. Larger numbers may be used in the event of a group message. A text color scheme may also be used to indicate preservation states.

In one embodiment, the message thread module 172 is configured to eliminate the ability to copy/paste a conversation? This prevents aspects of the conversation from being taken out of context. In addition, this feature keeps the record of the "saved" communications consistent.

Thus, it will be appreciated that the disclosed techniques allow for a digital communication mechanism that more naturally mimics the types of interactions to which individuals are accustomed. That is, individual utterances (entries) are transitory in nature, unless a user opts-in to preserve an utterance. Opting-in to preserve an utterance may result in feedback that allows a counter-party to know that another has preserved the entry.

In addition to providing a more natural communication flow, the invention may provide a more condensed communication thread where only perceived important entries are preserved. This can be advantageous in connection with the use of a mobile device, which has a small screen and therefore a limited ability to display information. This may also be advantageous as it reduces the amount of information that needs to be communicated across a network.

The invention has been disclosed in the context of text communications. However, the same techniques may be applied to email communications or threaded voicemail or multimedia communications.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to:

magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method implemented by a server with a processor and a memory storing instructions executed by the processor to maintain a first message thread and a second message thread between a first user and a second user by:

directing, by the server, a second client device to display a text entry of the second message thread for a duration of a transitory display period, wherein the text entry is from the first user and is presented on a second display screen associated with the second client device of the second user, and wherein the first user generates the text entry with a first indication to preserve the text entry in the first message thread, wherein the first indication is a first gesture applied to a first display screen of a first client device associated with the first user that is received by the server as the first indication;

automatically deleting at the server the text entry of the second message thread for the second user after the duration of the transitory display period unless a second indication of a second gesture applied to the second display screen presenting the text entry of the message thread on the second client device associated with the second user is received at the server during the transitory display period, in which case the text entry of the message thread is maintained by the server for the second message thread and the server provides feedback to the first user that the text entry of the second message thread is preserved; and modifying, at the direction of the server, the text entry of the first message thread associated with the first user on the first display screen associated with the first user if the server receives the second indication that the second user applied the second gesture to the second display screen associated with the second user during the transitory display period, wherein modifying includes the server providing first indicia indicating that only the first user provided the first indication and that there was no second indication and therefore only the first user preserved the text entry or second indicia in response to the first indication and the second indication to indicate that both the first user and the second user preserved the text entry.

2. The method of claim 1 wherein the transitory display period is a single digit number of seconds.

* * * * *